(12) United States Patent
Oota (10) Patent No.: US 10,864,702 B2
(45) Date of Patent: Dec. 15, 2020

(54) THERMAL TRANSFER SHEET

(71) Applicant: Dai Nippon Printing Co., Ltd., Tokyo (JP)

(72) Inventor: Mitsuhiro Oota, Tokyo (JP)

(73) Assignee: Dai Nippon Printing Co., Ltd., Shinjuku (JP)

( * ) Notice: Subject to any disclaimer, the term of this patent is extended or adjusted under 35 U.S.C. 154(b) by 219 days.

(21) Appl. No.: 16/063,422

(22) PCT Filed: Dec. 22, 2016

(86) PCT No.: PCT/JP2016/088422
§ 371 (c)(1),
(2) Date: Jun. 18, 2018

(87) PCT Pub. No.: WO2017/111049
PCT Pub. Date: Jun. 29, 2017

(65) Prior Publication Data
US 2019/0001621 A1   Jan. 3, 2019

(30) Foreign Application Priority Data

Dec. 25, 2015 (JP) .................................. 2015-254937

(51) Int. Cl.
| | | |
|---|---|---|
| *B32B 7/06* | (2019.01) | |
| *B32B 27/30* | (2006.01) | |
| *B41M 5/382* | (2006.01) | |
| *B41M 5/44* | (2006.01) | |

(Continued)

(52) U.S. Cl.
CPC ................ *B32B 7/06* (2013.01); *B32B 27/30* (2013.01); *B41M 5/363* (2013.01);
(Continued)

(58) Field of Classification Search
None
See application file for complete search history.

(56) References Cited

U.S. PATENT DOCUMENTS

| 5,302,433 A | 4/1994 | Miyai et al. | |
|---|---|---|---|
| 6,087,008 A * | 7/2000 | Yoshida | B41M 5/395 428/32.85 |

(Continued)

FOREIGN PATENT DOCUMENTS

| CN | 102729680 A | 10/2012 |
|---|---|---|
| JP | H01-216887 A1 | 8/1989 |

(Continued)

OTHER PUBLICATIONS

International Search Report and Written Opinion (Application No. PCT/JP2016/088422) dated Feb. 21, 2017.

*Primary Examiner* — Laura C Powers
(74) *Attorney, Agent, or Firm* — Burr & Brown, PLLC (57) ABSTRACT

Provided is a thermal transfer sheet that can suppress thermal fusion of the thermal transfer sheet and a transfer-receiving article and can improve the durability of a printed article obtained by transferring a transfer layer onto the transfer-receiving article, even if energy applied to the thermal transfer sheet was increased upon transferring the transfer layer onto the transfer-receiving article. This thermal transfer sheet 100 comprises a thermal transfer layer 10 on one surface of a substrate 1. The transfer layer 10 comprises one or more layers, and among the layers constituting the transfer layer 10, the layer closest to the substrate 1 contains a copolymer of isobutyl (meth)acrylate and a monomer having a carboxyl group, and the acid value of the copolymer is not less than 40 mg KOH/g.

1 Claim, 1 Drawing Sheet

(51) Int. Cl.
  *B41M 5/42* (2006.01)
  *B41M 5/36* (2006.01)
  *B41M 5/52* (2006.01)
  *B41M 7/00* (2006.01)
  *C08J 7/04* (2020.01)

(52) U.S. Cl.
  CPC .......... *B41M 5/38214* (2013.01); *B41M 5/42* (2013.01); *B41M 5/44* (2013.01); *C08J 7/042* (2013.01); *B41M 5/5254* (2013.01); *B41M 7/0027* (2013.01); *B41M 2205/04* (2013.01); *B41M 2205/38* (2013.01); *C08J 2367/02* (2013.01); *C08J 2433/10* (2013.01)

(56) References Cited

U.S. PATENT DOCUMENTS

| | | | |
|---|---|---|---|
| 6,308,630 | B1 | 10/2001 | Kurokawa et al. |
| 6,616,993 | B2 | 9/2003 | Usuki et al. |
| 2008/0057435 | A1* | 3/2008 | Weed .................... B41M 5/392 430/200 |

FOREIGN PATENT DOCUMENTS

| | | |
|---|---|---|
| JP | H05-185754 A1 | 7/1993 |
| JP | H09-290576 A1 | 11/1997 |
| JP | H11-065098 A1 | 3/1999 |
| JP | H11-263079 A1 | 9/1999 |
| JP | 2001-246845 A1 | 9/2001 |
| JP | 2001-260542 A1 | 9/2001 |
| JP | 2003-165278 A1 | 6/2003 |
| JP | 2010-076331 A1 | 4/2010 |

* cited by examiner

THERMAL TRANSFER SHEET

BACKGROUND

1. Field of the Invention

The present invention relates to a thermal transfer sheet.

2. Description of the Related Art

Various forms of the thermal transfer sheet for transferring a transfer layer onto a transfer-receiving article are known. For example, there are known various types of thermal transfer sheets such as ones proposed on Patent Literatures 1 to 3, (i) a thermal transfer sheet provided with a thermofusible ink layer as a transfer layer on one surface side of the substrate; (ii) a thermal transfer sheet provided with a receiving layer as a transfer layer on one surface side of the substrate (it may be sometimes referred to as an "intermediate transfer medium"); (iii) a thermal transfer sheet provided with a protective layer (it may be sometimes referred to as a "release layer") as a transfer layer on one surface side of the substrate (it may be sometimes referred to as a "protective layer transfer sheet"); and (iv) thermal transfer sheets in which these constitutions as mentioned above are appropriately combined, for example, a transfer layer having a laminated structure in which a release layer and a receiving layer are laminated in this order from the substrate side is provided on one surface side of a substrate, a thermal transfer sheet in which thermofusible ink layers and protective layers are layered in parallel on and across a same surface of the substrate, as being frame sequentially, etc. The transfer layers of these thermal transfer sheets are transferred onto the transfer-receiving article, individually, by superimposing the thermal transfer sheet and the transfer-receiving article and heating another surface side of the substrate by a heating device such as a thermal head or a heating roll.

In recent years, there is a high demand in the market for printers excellent in high-speed printing suitability, and in the printer, the energy to be applied to the thermal transfer sheet at the time of transferring the transfer layer onto the transfer-receiving article (it may be sometimes referred to as "thermal energy" or "applied energy") has been increasing steadily. Here, as a printer used for transferring the transfer layer of the thermal transfer sheet, a peeling-off during hot state type printer by which the energy is applied to the thermal transfer sheet to melt or soften the transfer layer, and before the transfer layer solidifies, the transfer layer transferred onto the thermal transfer-receiving article is allowed to be peeled from the thermal transfer sheet; and a peeling-off during cold state type printer by which the transfer layer transferred onto the thermal transfer-receiving article is allowed to be peeled from the thermal transfer sheet after the transfer layer solidifies; are known. Transfer of the transfer layer onto the transfer-receiving article is carried out by applying energy to the thermal transfer sheet in a state where the transfer-receiving article and the transfer layer of the thermal transfer sheet are in close contact with each other, transferring the transfer layer onto the transfer-receiving article, and then peeling the transferred transfer layer from the thermal transfer sheet. Incidentally, if the transfer-receiving article and the thermal transfer sheet cause thermal fusion upon the transfer of the transfer layer of the thermal transfer sheet to the transfer-receiving article, in concrete terms, the transfer-receiving article and the thermal transfer sheet are stuck to each other to the extent that the transferred transfer layer cannot be peeled from the thermal transfer sheet, for example, when using a thermal transfer sheet having a transfer layer directly formed on the substrate in order to transfer the transfer layer onto a transfer-receiving article and then causing unintentional thermal fusion between the transfer layer and the substrate, the thermal transfer sheet may be broken inside the printer, problems such as fracture of the thermal transfer sheet in the interior of the printer, or abnormal conveying of the thermal transfer sheet (it may be sometimes referred to as "JAM"), etc., are likely to occur. In particular, as the energy applied to the thermal transfer sheet at the time of transferring the transfer layer increases, there is a tendency that the frequency of occurrence of thermal fusion of the thermal transfer-receiving article and the thermal transfer sheet, and the frequency of occurrence of the abnormal conveying due to the thermal fusion increase. Further, the peeling-off during hot state type printer tends to more easily cause these problems than the peeling-off during cold state type printer.

Further, although it is required that the transfer layer to be transferred onto the transfer-receiving article has good durability, it has not been possible to sufficiently satisfy the durability of printed article obtained by transferring a transfer layer onto a transfer-receiving article while suppressing thermal fusion between the transfer-receiving article and the transfer layer which may occur when applying a high energy in order to transfer the transfer layer onto the transfer-receiving article. Thus, there is room for improvement in this respect.

PRIOR ART DOCUMENT

Patent Literature

Patent Literature 1: JP 9-290576 A
Patent Literature 2: JP 11-263079 A
Patent Literature 3: JP 2001-246845 A

SUMMARY OF INVENTION

Problem to be Solved by the Invention

The present invention is the one contrived in such a situation, and a main purpose of the present invention is to provide a thermal transfer sheet which is capable of suppressing the thermal fusion between the transfer-receiving article and the thermal transfer sheet even when the energy to be applied to the thermal transfer sheet upon transferring the thermal transfer layer onto the transfer-receiving article is enhanced, and which can improve the durability of a printed article obtained by transferring the transfer layer onto the transfer-receiving article.

The present invention for solving the above mentioned problem is a thermal transfer sheet in which a transfer layer is formed on one surface of a substrate, and which is characterized in that the transfer layer comprises one or more constituent layers, and the constituent layer closest to the substrate among the constituent layers of the transfer layer contains a copolymer of isobutyl (meth)acrylate and a monomer having a carboxyl group, and the acid value of the copolymer is not less than 40 mg KOH/g.

Effect of the Invention

According to the thermal transfer sheet of the present invention, it is possible to suppress the thermal fusion between the transfer-receiving article and the thermal transfer sheet even when the energy to be applied to the thermal transfer sheet upon transferring the thermal transfer layer onto the transfer-receiving article is enhanced, and also possible to improve the durability of a printed article obtained by transferring the transfer layer onto the transfer-receiving article.

DETAILED DESCRIPTION OF THE INVENTION

Hereinafter, some embodiments according to the present invention will be described with reference to the drawings. It should be noted that the present invention can be carried out in many different configurations or embodiments and is not to be interpreted as being limited to the described contents of the embodiments exemplified below. Further, in order to make the explanation clearer, the drawings may be schematically represented in terms of the width, thickness, shape, and the like of each part as compared with the actual embodiment, but the drawings merely illustrate certain emphasized embodiment, and thus the interpretation of the present invention is not limited thereto. Further, in this specification and respective drawings of the present application, if the assumption that a certain element is the same as the one illustrated in a preceding part of the specification or a preceding drawing and allocated a certain numeric symbol, the same numeric symbols is again allocated to the element in remaining parts of the specification or remaining drawings in order to omit the detailed explanation in the latter part as occasion demands.

«Thermal Transfer Sheet»

Figure 1:
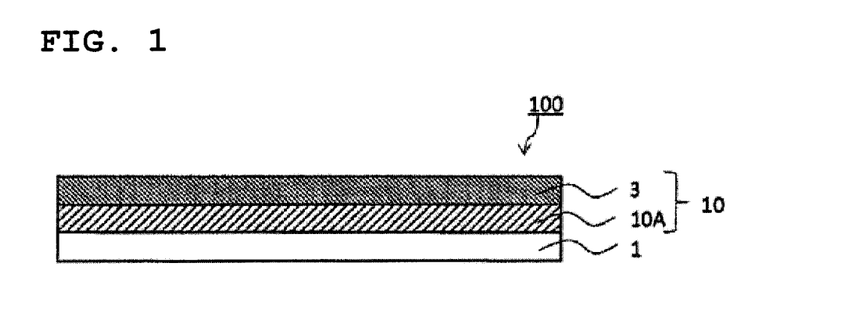
FIG. 1 is a schematic sectional view showing an embodiment of a thermal transfer sheet of the present invention.
Figure 2:
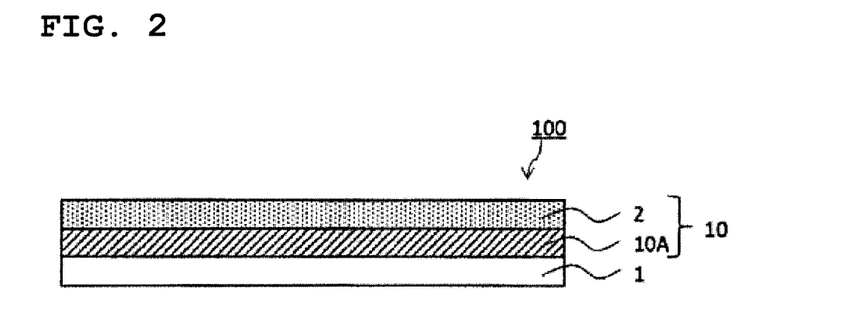
FIG. 2 is a schematic sectional view showing another embodiment of a thermal transfer sheet of the present invention.
Figure 3:
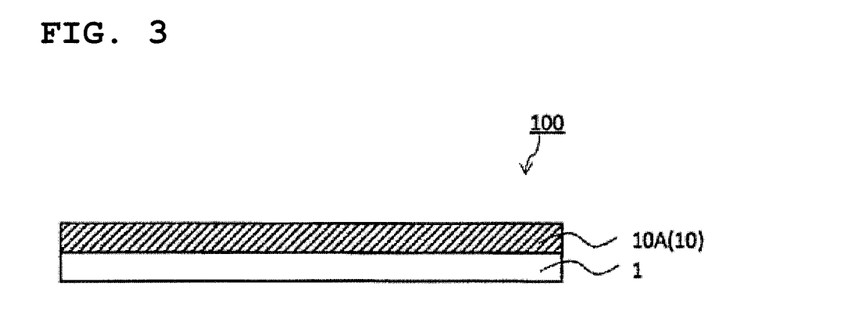
FIG. 3 is a schematic sectional view showing further another embodiment of a thermal transfer sheet of the present invention.

Now, a thermal transfer sheet of one embodiment according to the present invention (hereinafter, it is sometimes referred to as a "thermal transfer sheet of one embodiment") will be described in detail. FIGS. 1-3 are schematic sectional views showing thermal transfer sheets of the respective embodiments. As shown in FIGS. 1 to 3, the thermal transfer sheet 100 of one embodiment includes a substrate 1 and a transfer layer 10 positioned on one surface of the substrate 1.

(Substrate)

The substrate 1 is an essential component in the thermal transfer sheet 100 of one embodiment, and is provided to hold the transfer layer 10 positioned on one surface of the substrate 1. Although there is no particular limitation on the material of the substrate 1, it is desirable that the substrate 1 withstands the heat applied when the transfer layer 10 is transferred onto a transfer-receiving article and has mechanical properties that do not interfere with handling. As such the substrate 1, for instance, various plastic films or sheets, including polyesters such as polyethylene terephthalate, polyarylate, polycarbonate, polyurethane, polyimide, polyether imide, cellulose derivative, polyethylene, ethylene-vinyl acetate copolymer, polypropylene, polystyrene, acrylic resin, polyvinyl chloride, polyvinylidene chloride, polyvinyl alcohol, polyvinyl butyral, nylon, polyether ether ketone, polysulfone, polyethersulfone, tetrafluoro ethylene-perfluoro alkylvinyl ether copolymer, polyvinyl fluoride, tetrafluoro ethylene-ethylene copolymer, tetrafluoro ethylene-hexafluoro propylene copolymer, polychlorotrifluoro ethylene, polyvinylidene fluoride, etc., may be enumerated.

With respect to the thickness of the substrate, there is no particular limitation. In general, it may be in the range of not less than 2.5 μm and not more than 100 μm.

Further, as the substrate 1, the one that has been subjected to a surface treatment in advance may be used. Examples of the surface treatment method include corona discharge treatment, flame treatment, ozone treatment, ultraviolet irradiation treatment, radiation irradiation treatment, roughening treatment, chemical treatment, plasma treatment, low-temperature plasma treatment, primer treatment, grafting treatment and the like may be enumerated.

(Transfer Layer)

As shown in FIGS. 1 to 3, the transfer layer 10 is positioned on one side of the substrate 1. The transfer layer 10 is the layer which is to be transferred onto a transfer-receiving article, by superimposing the thermal transfer sheet of one embodiment and the transfer-receiving article and heating another surface side of the substrate by a heating device such as a heating roll, etc., (hereinafter, it is referred to as "heating device"), and which shows a layered constitution of two or more layers (See, FIG. 1 and FIG. 2), or shows a monolayer constitution consisting of a single layer (See, FIG. 3).

As one problem that may arise when transferring the transfer layer of the thermal transfer sheet onto the transfer-receiving article, the thermal fusion between the transfer-receiving article and the thermal transfer sheet is mentioned. Incidentally, in this specification of the present application, the "thermal fusion between the transfer-receiving article and the thermal transfer sheet" refers to a phenomenon where only the transfer layer transferred onto the transfer-receiving article cannot be separated from the thermal transfer sheet, because the constituent members of the thermal transfer sheet, which should intrinsically remain on the thermal transfer sheet side are compelled to be integrated with the transfer layer transferred onto the transfer-receiving article, when the transfer-receiving article and the thermal transfer sheet are superimposed and energy is applied from the thermal transfer sheet side by a heating means such as a thermal head in order to transfer the transfer layer of the thermal transfer sheet onto the thermal transfer sheet and then only the transfer layer transferred onto the transfer-receiving article is intended to be peeled from the thermal transfer sheet. For example, it refers to a phenomenon where the substrate and the transfer layer are compelled to be integrated with each other to the extent that the transfer layer transferred onto the transfer-receiving article cannot be separated from the substrate, when using a thermal transfer sheet having a transfer layer directly provided on a substrate. Alternatively, it refers to a phenomenon where certain constituent member(s) of the thermal transfer sheet are integrated with the transfer layer transferred to the transfer-receiving article to the extent that an unusual noise is caused when peeling off, even if only the transfer layer transferred onto the transfer-receiving article can be separated from the substrate. In addition, when the transfer-receiving article and the thermal transfer sheet are thermally fused with each other, it contributes to conveying abnormality in the printer, transfer failure, etc. When the degree of thermal fusion is low, it is possible to peel the transfer layer from the substrate, but the transfer interface (it is sometimes referred to as "peeling-off interface") of the transfer layer becomes rough and a degradation in the glossiness or the like is caused. In particular, in order to cope with high-speed printing suitability, when energy applied to the thermal transfer sheet upon transferring a transfer layer onto a transfer-receiving article is enhanced, or when using a peeling-off during hot state type printer or the like, the transfer-receiving article and the thermal transfer sheet tend to be thermally fused. Hereinafter, the case where the constituent member which directly contacts to the transfer layer is the substrate among the constituent members constituting the thermal transfer sheet will be mainly described, but the thermal transfer sheet of one embodiment is not limited to the configuration where the substrate and the transfer layer are directly contacted with each other, and it is also possible to provide any arbitrary layer(s) between the substrate and the transfer layer. In the latter case, the arbitrary layer or one of the arbitrary layers is the constituent member directly contacting with the transfer layer.

In order to improve the durability of the printed article obtained by transferring the transfer layer onto the transfer-receiving article, it is important to improve the durability of the layer located on the outermost surface of the printed article, that is, the layer closest to the substrate 1 among the layers constituting the transfer layer 10. Here, the layer closest to the substrate 1 among the layers constituting the transfer layer 10 is the layer located at the transfer interface when the transfer layer 10 is transferred onto the transfer-receiving article, and when certain measures focusing on improving the endurance of this layer are taken, it is impossible to sufficiently satisfy the peel-off property of the transfer layer.

Accordingly, in the thermal transfer sheet 100 of one embodiment, the layer closest to the substrate 1 among the layers constituting the transfer layer 10 is characterized by the fact that it contains a copolymer of isobutyl (meth) acrylate and a monomer having a carboxyl group, and an acid value of the copolymer being not less than 40 mg KOH/g.

Hereinafter, the layer closest to the substrate 1 among the layers constituting the transfer layer 10 may be referred to as a "basal layer" in some cases. As shown in FIG. 1, when the transfer layer 10 has a single layer structure, the transfer layer 10 becomes the "basal layer" as it is. Further, the copolymer of isobutyl (meth)acrylate and the monomer having a carboxyl group, whose acid value is not less than 40 mg KOH/g, may be referred to as "specific copolymer" in some cases. Furthermore, the "acid value" used in the present specification means the theoretical value of the number of milligrams of potassium hydroxide which is molar equivalent to the carboxyl group in 1 g of the polymer (solid content).

According to the thermal transfer sheet 100 of one embodiment in which the basal layer contains the "specific copolymer", even when the energy applied to the thermal transfer sheet at the time of transferring the transfer layer onto the transfer-receiving article is increased, in other words, even when the printing power is increased, it is possible to make the peel-off property when the transfer layer transferred onto the transfer-receiving article is peeled off from the substrate good. Thereby, it becomes possible to suppress various problems caused by insufficient peel-off of the transfer layer 10, specifically, the thermal fusion of the transfer-receiving article and the thermal transfer sheet which may occur inside the printer, and the reduction in the glossiness of the printed article obtained by transferring the transfer layer onto the transfer-receiving article, and the like.

Furthermore, according to the thermal transfer sheet 100 of one embodiment, it is possible to improve the durability of the printed article obtained by transferring the transfer layer 10 onto the transfer-receiving article using the thermal transfer sheet.

Although the detailed mechanism that exerts the above effect by the thermal transfer sheet 100 of one embodiment is not necessarily clarified at the present time, it is presumed that the isobutyl (meth)acrylate which constitutes the "specific copolymer" plays a role of improving the peel-off property of the basal layer. And, it is presumed that the peel-off property of the transfer layer 10 which includes the basal layer is improved by incorporating the copolymer containing isobutyl (meth)acrylate as a polymerizable component into the basal layer. In addition, in the copolymer containing isobutyl (meth)acrylate, the acid value thereof is thought to be closely related to the durability of the basal layer, and it is presumed that the durability of the basal layer is improved by incorporating, as the copolymer of isobutyl (meth)acrylate and the monomer, the copolymer having an acid value of not less than 40 mg KOH/g into the basal layer. Thus, it is possible to improve the durability of the printed article obtained by transferring the basal layer 10 onto the transfer-receiving article. Even if it is not due to this mechanism, the fact that the peel-off property of the transfer layer when peeling from the substrate is improved and the durability of the printed article which is obtained by transferring the transfer layer is improved, by adopting the constitution of the thermal transfer sheet of the one embodiment, in spite of enhancing the energy applied to the thermal transfer sheet when transferring the thermal transfer layer onto the transfer-receiving article, is also clear from the results of Examples and Comparative Examples described later.

Even if a copolymer having an acid value of not less than 40 mg KOH/g is contained in the basal layer, when the copolymer does not contain isobutyl (meth)acrylate, and it is a copolymer of a polymeriziable component other than isobutyl (meth)acrylate, for example, a copolymer of methyl (meth)acrylate and a monomer having a carboxyl group, it is impossible to satisfy the peel-off property of the transfer layer including the basal layer.

In addition, even if a copolymer of isobutyl (meth) acrylate and a monomer having a carboxyl group is contained in the basal layer, when the acid value of the copolymer is less than 40 mg KOH/g, sufficient durability cannot be imparted to the basal layer, and thus sufficient durability cannot be imparted to the printed article in which the transfer layer 10 including the basal layer is transferred.

From the above points, the isobutyl (meth)acrylate which constitutes the "specific copolymer" is the polymerizable component capable of sufficiently increasing the peel-off property, and it is inferred that the isobutyl (meth)acrylate is a polymerizable component capable of sustaining the peel-off property even when it is copolymerized with the monomer containing carboxyl group(s) in order to improve the durability.

With respect to the monomer having carboxyl group(s) which constitutes the "specific copolymer", there is no particular limitation, and for instance, (meth)acrylates having carboxyl group(s), monomers derived from unsaturated carboxylic acid such as unsaturated monocarboxylic acids, unsaturated dicarboxylic acids, unsaturated tricarboxylic acids, and the like may be enumerated. Concretely, (meth) acrylates having a carboxyl group may be enumerated. Examples of the (meth)acrylate having carboxyl group(s) include (meth)acrylic acid, maleic acid, fumaric acid, ω-carboxy-polycaprolactone mono (meth)acrylate, monohydroxyethyl (meth)acrylate phthalate, acrylic acid dimer, β-(meth)acroyloxy ethyl hydrogen succinate, 2-acryloyloxyethyl succinic acid, 2-methacryloyloxyethyl succinic acid, and the like.

There is no particular limitation on the copolymerization ratio between isobutyl (meth)acrylate and a monomer having carboxyl group(s), which constitutes the "specific copolymer", and it is preferable to determine the copolymerization ratio of the monomer having carboxyl group(s) to the isobutyl (meth)acrylate such that the acid value comes to 40 mg KOH/g or more. Incidentally, there is a tendency that the more the copolymerization ratio of the monomer having a carboxyl group to the isobutyl (meth)acrylate increases, the more the acid value of the copolymer increase.

A more preferable embodiment of the basal layer contains a "specific copolymer" having the acid value of not less than 50 mg KOH/g, further the acid value of not less than 60 mg KOH/g or more, particularly the acid value of not less than 70 mg KOH/g. For example, in the case where the transfer layer 10 has a laminated structure, when the basal layer contains the "specific copolymer" having the acidic value of not less than 50 mg KOH/g or more, further having the acid value of not less than 60 mg KOH/g, and particularly having the acid value of not less than 70 mg KOH/g, the durability of the transfer layer 10 can be further improved, and as a result, the durability of the printed article obtained by transferring the transfer layer onto the transfer-receiving article is further improved. Further, the surface quality of the layer provided on the basal layer can be improved, and the appearance of the printed article obtained by transferring the transfer layer 10 including the basal layer onto the transfer-receiving article is extremely high.

In particular, in the case where an aqueous type layer such as an aqueous type receiving layer is provided on the basal layer, when the wettability of the basal layer is low, the surface quality of the aqueous type receiving layer provided on the basal layer tends to be deteriorated, and the appearance of the printed article obtained by transferring the transfer layer 10 including these layers onto the object tends to become lower. Nevertheless, when the basal layer contains the "specific copolymer" having an acid value of not less than 50 mg KOH/g, preferably, an acid value of not less than 60 mg KOH/g, and more particularly, an acid value of not less than 70 mg KOH/g, the surface quality of the layer provided on the basal layer can be made satisfactory, not only in the case that the layer provided on the basal layer is a solvent type layer, but also in the case that it is a aqueous type layer. Incidentally, the "aqueous type layer" used herein refers to a layer formed by using a coating liquid prepared by dispersing or dissolving an aqueous resin dispersible or dissolvable in an aqueous solvent, such as a water-soluble resin or a water-dispersible resin, in an aqueous solvent.

The "specific copolymer" having an acid value of not less than 50 mg KOH/g can be obtained by increasing the copolymerization ratio of the monomer having a carboxyl group. Further, the basal layer of the preferred embodiment is an embodiment assuming a case where the transfer layer 10 has a layered structure, and it is not limited to this condition in the case where the transfer layer 10 shows a single layer structure consisting only of the basal layer.

Further, the "specific copolymer" may contain other polymerizable component(s) in addition to isobutyl (meth)acrylate and the monomer having a carboxyl group. There are no particular limitations on the other polymerizable component(s), and examples thereof may include alkyl esters of (meth)acrylic acid such as methyl (meth)acrylate, ethyl (meth)acrylate, butyl (meth)acrylate, lauryl (meth)acrylate, isobornyl (meth)acrylate, 2-ethylhexyl (meth)acrylate, octyl (meth)acrylate and the like; (meth)acrylic esters having a hydroxyl group within their molecules such as 2-hydroxyethyl (meth)acrylate, 2-hydroxybutyl (meth)acrylate, 2-hydroxy-3-phenoxypropyl (meth)acrylate and the like; and polymerizable monomers such as styrene and the like. The copolymerization ratio of the other copolymer(s) is not particularly limited, but it is preferable to be less than 50% by molar ratio.

The weight average molecular weight (Mw) and the glass transition temperature (Tg) of the "specific copolymer" are not particularly limited, but it is preferable that the "weight average molecular weight (Mn)" of the "specific copolymer" is not less than 6,000, and more desirably, not less than 11,500. An example of a preferable upper limit value of the weight average molecular weight (Mw) may be about 30000. With respect to the glass transition temperature (Tg) of the "specific copolymer", it is preferable to be not less than 50° C., and more desirably, not less than 75° C. or more. An example of a preferable upper limit value of the glass transition temperature (Tg) may be about 190° C.

The weight average molecular weight (Mw) referred herein means a value measured by gel permeation chromatography using polystyrene as a standard substance and is able to be measured by a method in accordance with JIS-K-7252-1 (2008). The glass transition temperature (Tg) referred herein means a temperature which is determined based on a measurement of change in calorific value (DSC method) by DSC (differential scanning calorimetry) in accordance with JIS-K-7121 (2012).

The containing amount of the "specific copolymer" contained in the basal layer is not particularly limited. In proportion to the containing amount of the "specific copolymer", it is possible to improve the peel-off property of the transfer layer at the time that the transfer layer transferred onto the transfer-receiving article is peeled from the substrate and to improve the durability of the transfer layer including the basal layer, even when the energy to be applied to the thermal transfer sheet at the time that the transfer layer is transferred onto the transfer-receiving article becomes enhanced. Nevertheless, it is preferable that the containing amount of the "specific copolymer" is not less than 30% by mass, more desirably, not less than 50% by mass, and most desirably, not less than 85% by mass, based on the total mass of the basal layer. The upper limit value is not particularly limited and it may take 100% by mass.

There is no particular limitation on the method of forming the basal layer, and the basal layer can be formed by dispersing or dissolving isobutyl (meth)acrylate, the monomer having carboxyl group(s), optional additive(s) used as necessary, and the like in a suitable solvent to prepare a coating liquid for forming basal layer, then coating the coating liquid for forming the basal layer on the substrate 1 or any layer positioned on the substrate 1 and drying the coated layer out. The thickness of the basal layer is not particularly limited, but it is preferably in the range of not less than 0.1 μm and not more than 50 μm, more preferably in the range of not less than 0.5 μm and not more than 10 μm or less. By setting the thickness of the basal layer within this range, it is possible to more effectively suppress the thermal fusion between the transfer-receiving article and the thermal transfer sheet, which can occur when transferring the transfer layer 10 onto the transfer-receiving article.

Next, a transfer layer 10 having a single layer structure consisting only of the basal layer and a transfer layer 10 having a layered structure including the basal layer will be described by way of examples.

(Transfer Layer of the First Configuration)

As shown in FIG. 1, the transfer layer 10 of the first configuration is formed by layering a basal layer 10A and a protective layer 3 in this order on one surface of a substrate 1, and thus the transfer layer 10 that has such a layered constitution is located on the one surface of the substrate 1. The thermal transfer sheet 100 having the transfer layer 10 of the first configuration is used, by transferring the transfer layer 10 of the first configuration onto a transfer-receiving article, to impart durability, weather resistance and the like to images or the like of the transfer-receiving article that is intended to be covered by the transfer layer 10 of the first configuration, and thus serves as a so-called protective layer transfer sheet.

The basal layer of the transfer layer 10 of the first configuration can use the basal layer described above as it is, and the detailed description thereof will be omitted.

(Protective Layer)

As a component of the protective layer 3, for example, an acrylic resin, a vinyl chloride-vinyl acetate copolymer, an epoxy type resin, a polyester type resin, a polycarbonate type resin, a butyral type resin, a polyamide type resin, a vinyl chloride type resin or the like may be exemplified.

Further, it is also possible to form the protective layer 3 containing an ultraviolet absorber. According to the protective layer 3 containing the ultraviolet absorber, by transferring the transfer layer 10 of the first configuration, it is possible to improve the light resistance, weather resistance and the like of the images or the like of the transfer-receiving article that is intended to be covered by the transfer layer 10 of the first configuration. Examples of the ultraviolet absorber include salicylate type, benzophenone type, benzotriazole type, triazine type, substituted acrylonitrile type, nickel chelate type, hindered amine type and the like which are conventionally known as organic ultraviolet absorbers. Incidentally, high molecular materials each in which an addition polymerizable double bond such as a vinyl group, an acryloyl group, a methacryloyl group, or an alcoholic hydroxyl group, an amino group, a carboxyl group, an epoxy group, an isocyanate group or the like is introduced to any of these ultraviolet absorbers are ultraviolet absorbing resins.

The protective layer 3 can be prepared, for example, by dispersing or dissolving the ingredients as mentioned above or the like in a suitable solvent to prepare a coating liquid for forming protective layer, then coating the coating liquid for forming the protect layer on the basal layer 10A and drying the coated layer out. The thickness of the protective layer 3 is not particularly limited, but is usually in the range of not less than 0.5 μm and not more than 50 μm.

(Adhesive Layer)

Further, an adhesive layer (not shown) can be positioned on the protective layer 3. According to the transfer layer 10 of the first configuration in which the adhesive layer is further disposed on the protective layer 3, the adhesion between the transfer layer 10 and the transfer-receiving article can be improved. As a component of the adhesive layer, for example, any conventionally known adhesive agents, each of which mainly comprises an acrylic resin, a vinyl type resin, a polyester type resin, a urethane type resin, a polyamide type resin, an epoxy type resin, a rubber type resin, an ionomer resin or the like, may be enumerated. Although the thickness of the adhesive layer is not particularly limited, it is preferably to be in the range of not less than 0.1 μm and not more than 50 μm, more preferably, in the range of not less than 1 μm and not more than 10 μm.

(Transfer Layer of the Second Configuration)

As shown in FIG. 2, the transfer layer 10 of the second configuration is formed by layering a basal layer 10A and a receiving layer 2 in this order on one surface of a substrate 1, and thus the transfer layer 10 that has such a layered constitution is located on the one surface of the substrate 1. The thermal transfer sheet 100 having the transfer layer 10 of the second configuration is used, by forming a thermal transfer image on the receiving layer 2 located furthest from the substrate 1 out of the layers constituting the transfer layer 10 of the second configuration, and then transferring the transfer layer 10 of the second configuration including the receiving layer 2 on which the thermal transfer image is formed onto the transfer-receiving article in order to obtain a printed article, and plays a role as a so-called intermediate transfer medium.

The basal layer in the transfer layer 10 of the second configuration can use the basal layer described above as it is, and the detailed description thereof will be omitted.

(Receiving Layer)

As a component of the receiving layer 2, for example, polyolefin resins such as polypropylene, halogenated resins such as polyvinyl chloride or polyvinylidene chloride, vinyl polymers such as polyvinyl acetate, vinyl chloride-vinyl acetate copolymer, ethylene-vinyl acetate copolymer or polyacrylic ester, polyester resins such as polyethylene terephthalate or polybutylene terephthalate, polystyrene resins, polyamide resins, copolymers of an olefin such as ethylene or propylene and another vinyl monomer, cellulose type resins such as ionomer or cellulose diastase, polycarbonate type resins, and the like may be enumerated.

The receiving layer 2 can be prepared, for example, by dispersing or dissolving the ingredients as mentioned above or the like in a suitable solvent to prepare a coating liquid for forming receiving layer, then coating the coating liquid for forming receiving layer on the basal layer 10A and drying the coated layer out. The thickness of the receiving layer 2 is not particularly limited, but is usually in the range of not less than 1 μm and not more than 10 μm.

Further, an arbitrary layer, for example, an intermediate layer or the like can be provided between the basal layer 10A and the receiving layer 2. An adhesive layer or the like can also be provided on the receiving layer 2.

It is also possible to form a transfer layer which is a combination of the transfer layer 10 of the first configuration and the transfer layer 10 of the second configuration. For example, a thermal transfer sheet in which the transfer layer 10 having a layered structure in which the basal layer, the protective layer 3, and the receiving layer 2 are layered in this order is formed on one surface of the substrate 1 can be obtained.

(Transfer Layer of Third Configuration)

In the transfer layer 10 of the third configuration, as shown in FIG. 3, the transfer layer 10 having a single layer structure composed only of the basal layer 10 is positioned on one surface of the substrate 1.

In the thermal transfer sheet 100 having the transfer layer 10 of the third configuration, it is possible to impart various functions to the thermal transfer sheet 100 by including any functional ingredient together with "specific copolymer" in the basal layer 10A.

For example, by adding a conventionally known colorant, and if necessary, various additives such as a wax component, a mineral oil, a vegetable oil, a higher fatty acid such as stearic acid, a plasticizer, a thermoplastic resin, filler and the like to the basal layer 10A, in addition to the "specific copolymer", it is possible to form a thermal transfer sheet 100 having the transfer layer 10 of the third configuration as a thermofusible ink layer.

Examples of the wax component include microcrystalline waxes, carnauba waxes, paraffin waxes and the like. In addition, Fischer-Tropsch waxes, various low molecular weight polyethylenes, woody waxes, bees waxes, spermaceti waxes, insect waxes, wool waxes, shellac waxes, candelilla waxes, petrolatum, polyester waxes, partially modified wax, fatty acid esters, fatty acid amides may be enumerated.

As the colorant, it is possible to appropriately select from known organic or inorganic pigments or dyes, for example, those which have a sufficient coloring concentration and do not discolor or fade due to light, heat or the like are preferable. Further, it may be a substance that develops color when heated, or a substance that develops color by being brought into contact with a component applied to the surface of the transfer-receiving article. For example, black coloring agents and the like can be enumerated.

On the other hand, by including the component of the protective layer 3 described in the transfer layer 10 of the first configuration in the basal layer 10 A, in addition to the "specific copolymer", it is possible to prepare a basal layer also having a function as a protective layer.

Although the transfer layer 10 including the basal layer has been described by way of various forms, the thermal transfer sheet 100 of one embodiment is characterized in that, by including the "specific copolymer" in the basal layer which is the layer closest to the substrate 1 among the layers constituting the transfer layer 10, even when the energy applied to the thermal transfer sheet is increased at the time of transferring the transfer layer onto the transfer-receiving article, it is possible to improve the peel-off property of the transfer layer at the time of peeling the transfer layer transferred thereon from the substrate, in other words, it is possible to suppress thermal fusion between the transfer-receiving article and the thermal transfer sheet, and, the durability of the basal layer (the durability of the printed article obtained by transferring the transfer layer 10 including the basal layer on the transfer-receiving article) is improved. Therefore, as long as Condition 1: a transfer layer of a single layer or multilayer structure is provided on one side of a substrate, and Condition 2: among the layers constituting the transfer layer, the layer nearest to the substrate 1 contains the "specific copolymer" are satisfied, other conditions are not limited in any way, and any configuration or embodiment other than those exemplified above can be taken according to the present invention.

(Optional Layer)

The thermal transfer sheet 100 of one embodiment may include any arbitrary layer(s) that does not constitute the transfer layer. As the arbitrary layer, a release layer (not shown) provided between the substrate and the transfer layer 10 for improving transferability of the transfer layer 10, and a back face layer release layer provided on the other surface side of the substrate 1 for improving heat resistance and improving running performance of the heating member such as a thermal head, and the like may be enumerated. For example, in the thermal transfer sheet having the transfer layer 10 of the third configuration, a release layer may be provided between the substrate 1 and the basal layer 10A as a hot melt ink layer.

In addition, colorant layers (not shown) can be provided on the same surface of one side of the substrate 1 so as to be layered in parallel on the substrate across the surface of the substrate, as being frame sequentially together with any of the above mentioned various types of transferring layers.

(Transfer Receiving Article)

As the transfer receiving article to which the transfer layer 10 of the thermal transfer sheet 100 according to one embodiment is transferred, there is no particular limitation, and for instance, any of plain papers, high quality papers, tracing papers, plastic films, plastic cards mainly composed of vinyl chloride, vinyl chloride-vinyl acetate copolymer or polycarbonate, thermal transfer image-receiving sheets, printed articles each of which is obtained by transferring a transfer layer of an intermediate transfer medium onto an arbitrary article, and the like may be enumerated.

(Printer)

There is no particular limitation on a printer used for transferring the transfer layer 10 of the thermal transfer sheet 100 according to one embodiment onto a transfer-receiving article, and any known printer having a heating member such as a thermal head can be used. In the thermal transfer sheet 100 of one embodiment, even when the energy applied to the thermal transfer sheet is increased at the time of transferring the transfer layer onto the transfer-receiving article, it is possible to improve the peeling-off of the transfer layer when peeling the layer from the substrate. Therefore, the thermal transfer sheet of one embodiment can be particularly suitably used when using a printer capable of applying high energy, a peeling-off during hot state type printer or the like.

EXAMPLES

Hereinafter, the present invention will be described with referring to Examples and Comparative Examples. Herein, the simplified expressions of "part(s)" and "%" in this specification are on a mass basis and are values converted into solid ingredients, unless otherwise especially mentioned. Further, "Mw" represents a weight average molecular weight, and "Tg" represents a glass transition temperature.

Example 1

As a substrate, polyethylene terephthalate film which had 4.5 µm in thickness was used. On one surface of this substrate, a coating liquid for forming basal layer 1 having the following composition was coated so as to obtain a thickness of 1 µm in the dried state and then the coated liquid was dried to form a basal layer. Then, on the basal layer thus formed, a coating liquid for forming protective layer 1 having the following composition was coated so as to obtain a thickness of 1 µm in the dried state and then the coated liquid was dried to form a protective layer. Further, on another surface side of the substrate, a coating liquid for forming back face layer having the following composition was coated so as to obtain a thickness of 1 µm in the dried state and then the coated liquid was dried to form a back face layer. Ultimately, a thermal transfer sheet of Example 1 in which the transfer layer consisting of the basal layer and the protective layer layered mutually was formed on one surface of the substrate, and the back face layer was formed on the another surface of the substrate was prepared.

<Coating Liquid for Forming Basal Layer 1>

| | |
|---|---|
| Copolymer of isobutyl methacrylate and acrylic acid (acid value: 72 mg KOH/g, Mw: 11600, Tg: 77° C.) | 25 parts |

-continued

| | |
|---|---|
| Methyl ethyl ketone | 67 parts |
| Normal propyl acetate | 8 parts |

<Coating Liquid for Forming Protective Layer 1>

| | |
|---|---|
| Vinyl chloride-vinyl acetate copolymer (SOLBIN (registered trademark) CNL, manufactured by Nissin Chemical Industry Co., Ltd.) | 20 parts |
| toluene | 40 parts |
| Methyl ethyl ketone | 40 parts |

<Coating Liquid for Forming Back Face Layer>

| | |
|---|---|
| Polyvinyl butyral resin (S-LEC (registered trademark) BX-1, manufactured by Sekisui Chemical Co., Ltd.) | 10 parts |
| Polyisocyanate curing agent (TAKENATE (registered trademark) D218, manufactured by Mitsui Chemicals, Inc.) | 2 parts |
| Phosphoric ester (Plysurf (registered trademark) A208S, manufactured by Daiichi Kogyo Seiyaku Co., Ltd.) | 2 parts |
| toluene | 43 parts |
| Methyl ethyl ketone | 43 parts |

Example 2

A thermal transfer sheet of Example 2, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer 2 having the following composition to form a basal layer.
<Coating Liquid for Forming Basal Layer 2>

| | |
|---|---|
| Copolymer of isobutyl methacrylate and acrylic acid (acid value: 93 mg KOH/g, Mw: 12500, Tg: 81° C.) | 25 parts |
| Methyl ethyl ketone | 67 parts |
| Normal propyl acetate | 8 parts |

Example 3

A thermal transfer sheet of Example 3, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer 3 having the following composition to form a basal layer.
<Coating Liquid for Forming Basal Layer 3>

| | |
|---|---|
| Copolymer of isobutyl methacrylate and acrylic acid (acid value: 49 mg KOH/g, Mw: 11400, Tg: 74° C.) | 25 parts |
| Methyl ethyl ketone | 67 parts |
| Normal propyl acetate | 8 parts |

Example 4

A thermal transfer sheet of Example 4, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer 4 having the following composition to form a basal layer.
<Coating Liquid for Forming Basal Layer 4>

| | |
|---|---|
| Copolymer of isobutyl methacrylate and acrylic acid (acid value: 122 mg KOH/g, Mw: 13700, Tg: 85° C.) | 25 parts |
| Methyl ethyl ketone | 67 parts |
| Normal propyl acetate | 8 parts |

Example 5

A thermal transfer sheet of Example 5, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer 5 having the following composition to form a basal layer.
<Coating Liquid for Forming Basal Layer 5>

| | |
|---|---|
| Copolymer of isobutyl methacrylate and acrylic acid (acid value: 151 mg KOH/g, Mw: 14400, Tg: 89° C.) | 25 parts |
| Methyl ethyl ketone | 67 parts |
| Normal propyl acetate | 8 parts |

Example 6

A thermal transfer sheet of Example 6, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer 6 having the following composition to form a basal layer.
<Coating Liquid for Forming Basal Layer 6>

| | |
|---|---|
| Copolymer of isobutyl methacrylate and acrylic acid (acid value: 168 mg KOH/g, Mw: 14900, Tg: 92° C.) | 25 parts |
| Methyl ethyl ketone | 67 parts |
| Normal propyl acetate | 8 parts |

Example 7

A thermal transfer sheet of Example 7, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer 7 having the following composition to form a basal layer.

<Coating Liquid for Forming Basal Layer 7>

| | |
|---|---|
| Copolymer of isobutyl methacrylate and acrylic acid (acid value: 192 mg KOH/g, Mw: 18100, Tg: 96° C.) | 25 parts |
| Methyl ethyl ketone | 67 parts |
| Normal propyl acetate | 8 parts |

Example 8

A thermal transfer sheet of Example 8, in which the transfer layer consisting only of the basal layer was formed on one surface of the substrate, and the back face layer was formed on the another surface of the substrate, was obtained by carrying out the same procedure in Example 1 except that the formation of the protective layer on the basal layer was omitted.

Example 9

A thermal transfer sheet of Example 9, in which the transfer layer consisting only of the basal layer was formed on one surface of the substrate, and the back face layer was formed on the another surface of the substrate, was obtained by carrying out the same procedure in Example 2 except that the formation of the protective layer on the basal layer was omitted.

Example 10

A thermal transfer sheet of Example 10, in which the transfer layer consisting only of the basal layer was formed on one surface of the substrate, and the back face layer was formed on the another surface of the substrate, was obtained by carrying out the same procedure in Example 3 except that the formation of the protective layer on the basal layer was omitted.

Example 11

A thermal transfer sheet of Example 11, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming protective layer 1 was replaced by a coating liquid for forming protective layer 2 having the following composition to form a basal layer.

<Coating Liquid for Forming Protective Layer 2>

| | |
|---|---|
| Water dispersed type polyester resin (MD-1480, manufactured by Toyobo Co., Ltd.) | 80 parts |
| Isopropyl alcohol | 20 parts |

Example 12

A thermal transfer sheet of Example 12, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming protective layer 1 was replaced by a coating liquid for forming protective layer 3 having the following composition to form a basal layer.

<Coating Liquid for Forming Protective Layer 3>

| | |
|---|---|
| Water dispersed type polyester resin (MD-2000, manufactured by Toyobo Co., Ltd.) | 50 parts |
| Water | 10 parts |
| Isopropyl alcohol | 20 parts |

Example 13

A thermal transfer sheet of Example 13, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer 8 having the following composition to form a basal layer.

<Coating Liquid for Forming Basal Layer 8>

| | |
|---|---|
| Copolymer of isobutyl methacrylate and acrylic acid (acid value: 72 mg KOH/g, Mw: 11600, Tg: 77° C.) | 22.5 parts |
| Methyl methacrylate resin (acid value: 0 mg KOH/g, Mw: 14000, Tg: 105° C.) | 2.5 parts |
| Methyl ethyl ketone | 67 parts |
| Normal propyl acetate | 8 parts |

Example 14

A thermal transfer sheet of Example 14, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer 9 having the following composition to form a basal layer.

<Coating Liquid for Forming Basal Layer 9>

| | |
|---|---|
| Copolymer of isobutyl methacrylate and acrylic acid (acid value: 72 mg KOH/g, Mw: 11600, Tg: 77° C.) | 17.5 parts |
| Ethyl methacrylate resin (acid value: 0 mg KOH/g, Mw: 13800, Tg: 65° C.) | 7.5 parts |
| Methyl ethyl ketone | 67 parts |
| Normal propyl acetate | 8 parts |

Example 15

A thermal transfer sheet of Example 15, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer having the following composition to form a basal layer.

<Coating Liquid for Forming Basal Layer 10>

| | |
|---|---|
| Copolymer of isobutyl methacrylate and acrylic acid (acid value: 72 mg KOH/g, Mw: 11600, Tg: 77° C.) | 20 parts |
| Ethyl methacrylate resin (acid value: 0 mg KOH/g, Mw: 21600, Tg: −22° C.) | 5 parts |
| Methyl ethyl ketone | 67 parts |
| Normal propyl acetate | 8 parts |

Comparative Example 1

A thermal transfer sheet of Comparative Example 1, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer A having the following composition to form a basal layer.
<Coating Liquid for Forming Basal Layer A>

| | |
|---|---|
| Copolymer of isobutyl methacrylate and acrylic acid (acid value: 23 mg KOH/g, Mw: 10600, Tg: 70° C.) | 25 parts |
| Methyl ethyl ketone | 67 parts |
| Normal propyl acetate | 8 parts |

Comparative Example 2

A thermal transfer sheet of Comparative Example 2, in which the transfer layer consisting of the basal layer and the protective layer layered mutually was formed on one surface of the substrate, and the back face layer was formed on the another surface of the substrate, was obtained by carrying out the same procedure in Example 1 except that the coating liquid for forming basal layer 1 was replaced by a coating liquid for forming basal layer B having the following composition to form a basal layer.
<Coating Liquid for Forming Basal Layer B>

| | |
|---|---|
| Acrylic resin (BR87, manufactured by Mitsubishi Rayon Co., Ltd.) (acid value: 10.5 mg KOH/g, Mw: 25000, Tg: 105° C.) | 20 parts |
| Methyl ethyl ketone | 40 parts |
| Toluene | 40 parts |

(Formation of Thermal Transfer Image)

On a transfer image-receiving layer of a thermal transfer image-receiving sheet prepared by the following procedure, a thermal transfer image was formed by printing a black solid image consisting of yellow, magenta, and cyan dyes, under a thermal transfer image forming condition mentioned below. As the yellow, magenta, and cyan dyes, a sublimation type thermal transfer sheet which was prepared in the following manner was used.
(Preparation of Thermal Transfer Image-Receiving Sheet)

On a porous film layer made of a porous polyethylene film (Toyopearl (registered trademark) SS P4255, manufactured by Toyobo Co., Ltd., thickness: 35 μm), a coating liquid for forming intermediate layer having the following composition was coated and then dried in accordance with the gravure reverse coating method, so as to form an intermediate layer having a thickness of 1.5 μm in the dried state.

Then, on the intermediate layer, a coating liquid for forming dye-receiving layer having the following composition was coated and then dried in accordance with the gravure reverse coating method, so as to form a dye-receiving layer having a thickness of 5 μm in the dried state. On another side surface of the porous polyethylene film which was opposite to the surface onto which the intermediate layer and the dye-receiving layer were formed, a coating liquid for forming adhesive layer having the following composition was coated and then dried in accordance with the gravure reverse rolls coating method, so as to form an adhesive layer having a thickness of 5 μm in the dried state. Then, this adhesive layer side of the porous film was adhered to RC paper (155 g/m², 151 μm in thickness, manufactured by Mitsubishi Paper Mills) so as to form a thermal transfer image-receiving sheet.
(Coating Liquid for Forming Intermediate Layer)

| | |
|---|---|
| Polyester resin (Polyester (registered trademark) WR-905, manufactured by The Nippon Synthetic Chemical Industry Co., Ltd.) | 50 parts |
| Titanium oxide (TCA888, manufactured by Tochem Products) | 20 parts |
| Fluorescent whitening agent (Uvitex (registered trademark) BAC, manufactured by BASF Japan Co.) | 1.2 parts |
| Water | 14.4 parts |
| Isopropyl alcohol | 14.4 parts |

(Coating Liquid for Forming Dye-Receiving Layer)

| | |
|---|---|
| Vinyl chloride-vinyl acetate copolymer (SOLBIN (registered trademark) C, manufactured by Nissin Chemical Industry Co., Ltd.)) | 60 parts |
| Epoxy-modified silicone (X-22-3000T, manufactured by Shin-Etsu Chemical Co., Ltd.) | 1.2 parts |
| Metylstyl-modified silicone (X-24-510, manufactured by Shin-Etsu Chemical Co., Ltd.) | 0.6 parts |
| Methyl ethyl ketone | 2.5 parts |
| Toluene | 2.5 parts |

(Coating Liquid for Forming Adhesive Layer)

| | |
|---|---|
| Urethane resin (TAKELAC (registered trademark) A-969V, manufactured by Mitsui Chemical Inc.) | 30 parts |
| Isocyanate (TAKENATE (registered trademark) D218A-5, manufactured by Mitsui Chemical Inc.) | 10 parts |
| Ethyl acetate | 100 parts |

(Preparation of Sublimation Type Thermal Transfer Sheet)

As a substrate, polyethylene terephthalate film which underwent easy-adhesive treatment in advance, and had 4.5 μm in thickness was used. On this substrate, a coating liquid for forming heat-resistant lubricating layer having the following composition was coated so as to obtain a thickness of 0.8 μm in dried state, thereby a heat-resistant lubricating layer was formed. Then, on the reverse surface side of the substrate, a coating liquid for forming yellow dye layer, a coating liquid for forming magenta dye layer, and a coating liquid for forming cyan dye layer were coated in this order as being frame sequentially, so as to obtain each individual thickness of 0.6 μm in a dried state, thereby the dye layers were formed. Ultimately, a sublimation type thermal transfer sheet was prepared.

(Coating Liquid for Forming Heat-Resistant Lubricating Layer)

| | |
|---|---|
| Polyvinyl acetal resin | 60.8 parts |
| (S-LEC (registered trademark) KS-1, manufactured by Sekisui Chemical Co., Ltd.) | |
| Polyisocyanate | 4.2 parts |
| (BURNOCK (registered trademark) D750, manufactured by DIC Corporation) | |
| Filler (zinc stearyl phosphate) | 10 parts |
| (LBT-1830 purified, manufactured by Sakai Chemical Industry Co., Ltd.) | |
| Filler (zinc stearate) | 10 parts |
| (SZ-PF, manufactured by Sakai Chemical Industry Co., Ltd.) | |
| Filler (polyethylene wax) | 3 parts |
| (Polyethylene wax 3000, manufactured by Toyo ADL Corporation) | |
| Filler (ethoxylated alcohol denatured wax) | 7 parts |
| (Unitox 750, manufactured by Toyo ADL Corporation) | |
| toluene | 200 parts |
| methyl ethyl ketone | 100 parts |

(Coating Liquid for Forming Yellow Dye Layer)

| | |
|---|---|
| Disperse Yellow 201 | 4.0 parts |
| polyvinyl acetal resin | 3.5 parts |
| (S-LEC (registered trademark) KS-5, manufactured by Sekisui Chemical Co., Ltd.) | |
| Polyethylene wax | 0.1 part |
| Methyl ethyl ketone | 45.0 parts |
| Toluene | 45.0 parts |

(Coating Liquid for Forming Magenta Dye Layer)

| | |
|---|---|
| Disperse Red 60 | 1.5 parts |
| Disperse Violet 26 | 2.0 parts |
| polyvinyl acetal resin | 4.5 parts |
| (S-LEC (registered trademark) KS-5, manufactured by Sekisui Chemical Co., Ltd.) | |
| Polyethylene wax | 0.1 part |
| Methyl ethyl ketone | 45.0 parts |
| Toluene | 45.0 parts |

(Coating Liquid for Forming Cyan Dye Layer)

| | |
|---|---|
| Solvent Blue 63 | 2.0 parts |
| Disperse Blue 354 | 2.0 parts |
| polyvinyl acetal resin | 3.5 parts |
| (S-LEC (registered trademark) KS-5, manufactured by Sekisui Chemical Co., Ltd.) | |
| Polyethylene wax | 0.1 part |
| Methyl ethyl ketone | 45.0 parts |
| Toluene | 45.0 parts |

(Thermal Transfer Image Forming Condition)
Thermal head: F3598 (manufactured by Toshiba Hokuto Electronics Co., Ltd.)
Average resistance of heating element: 5176 (Ω)
Print density in main scanning direction: 300 dpi
Print density in sub scanning direction: 300 dpi
Printing Power: 0.12 (W/dot)
One line cycle; 2 (msec.)
Pulse duty: 85%
Print starting temperature; 35.5 (° C.)
(Evaluation of Peeling Force)
 Each of the transfer layers of the thermal transfer sheets of Examples and Comparative Examples was transferred onto the image-formed article obtained above by using the following peeling-off during hot state type test printer 1 in order to obtain printed articles of Examples and Comparative Examples.
(Test Printer 1 (Peeling-Off During Hot State Type))
Average resistance of heating element: 5241 (Ω)
Print density in main scanning direction: 300 dpi
Print density in sub scanning direction: 300 dpi
Printing Voltage: 28 (V)
Printing Power: 0.15 (W/dot)
One line cycle; 1 (msec.)
Pulse duty: 85%
Print starting temperature; 29.0-36.0 (° C.)
Distance from heating point to stripping plate: 4.5 (mm)
Conveying Speed: 84.6 (mm/Sec.)
Printing pressure: 3.5-4.0 (kgf)
Evaluation image: 255 gradations solid image
 In obtaining these printed articles, the tensile strength of the thermal transfer sheet at the time of peeling the thermal transfer sheet of each example and comparative example from the image-formed article after printing was measured by means of a tension meter (ASK-1000, manufactured by Okura Industry Co., Ltd.) provided between a winding roll for the thermal transfer sheet and the stripping plate within the printer. Table 1 shows measurement results of tensile strength (peeling force). In this method, when the tensile strength is measured under the condition that the winding speed by the winding roll is controlled to be constant (conveying speed: 84.6 mm/sec.), it becomes possible to measure the peeling force caused by the thermal transfer sheet at the time of peeling off. When the peeling force is less than 0.1 N/cm, the peeling-off (releasability) of the thermal transfer sheet from the image-formed article is good, and it means that the occurrence of the thermal fusion between the transfer-receiving article and the thermal transfer sheet and the like can be suppressed. The tensile strength measured by the tension meter when peeling the transfer layer transferred onto the thermal transfer image-receiving sheet from the substrate is synonymous with tension, and the value of tensile strength shows a substantial value of peeling-off force obtained when peeling the transfer layer transferred onto the thermal transfer image-receiving sheet from the substrate after the transfer layer is transferred to the thermal transfer image-receiving sheet.
(Durability Evaluation)
 In the same manner as in the evaluation of the peeling force, except that the printing voltage of the following peeling-off during hot state type test printer 1 was changed from 28 V to 23 V (printing power: 0.10 (W/dot)), the transfer layers of the thermal transfer sheets of Examples and Comparative Examples were transferred onto the image-formed article obtained above to obtain printed articles of the respective Examples and Comparative Examples. The printed article of each Example and Comparative Example obtained here was subjected to a test according to JIS-L-0849 (2013), and the durability was evaluated based on the following evaluation criteria. The evaluation results are also shown in Table 1.
"Evaluation Criteria"
A: No scratches can be seen on printed article.
B: Although some scratches are seen in the printed article, it is almost inconspicuous.
C: Some scratches are seen on the printed article, and they stand out.
NG: Many scratches are seen on printed article.

TABLE 1

| | Physical properties of isobutyl methacrylate-acrylic acid copolymer (*1) | | | Evaluation of Peeling Force (Printing voltage: 28 V) | Evaluation of Durability (Printing voltage: 23 V) |
|---|---|---|---|---|---|
| | Molecular weight [Mw] | Acid value (mgKOH/g) | Glass transition temperature [Tg] | | |
| Example 1 | 11600 | 72 | 77 | 0.0263 | A |
| Example 2 | 12500 | 93 | 81 | 0.0165 | A |
| Example 3 | 11400 | 49 | 74 | 0.0140 | B |
| Example 4 | 13700 | 122 | 85 | 0.0278 | A |
| Example 5 | 14400 | 151 | 89 | 0.0255 | A |
| Example 6 | 14900 | 168 | 92 | 0.0288 | A |
| Example 7 | 18100 | 192 | 96 | 0.0263 | A |
| Example 8 | 11600 | 72 | 77 | 0.0156 | A |
| Example 9 | 12500 | 93 | 81 | 0.0160 | A |
| Example 10 | 11400 | 49 | 74 | 0.0123 | B |
| Example 11 | 11600 | 72 | 77 | 0.0274 | A |
| Example 12 | 11600 | 72 | 77 | 0.0278 | A |
| Example 13 | 11600 | 72 | 77 | 0.0489 | A |
| Example 14 | 11600 | 72 | 77 | 0.0325 | B |
| Example 15 | 11600 | 72 | 77 | 0.0299 | B |
| Comparative Example 1 | 10600 | 23 | 70 | 0.020 | C |
| Comparative Example 2 | 25000 | 10.5 | 105 | ruptured | B |

EXPLANATION OF NUMERIC SYMBOLS

1 . . . Substrate
2 . . . Receiving layer
3 . . . Protective layer
10A . . . Basal layer
10 . . . Transfer layer
100 . . . Thermal transfer sheet

The invention claimed is:

1. A thermal transfer sheet comprising:
a substrate; and
a transfer layer formed on one surface of the substrate, wherein the transfer layer comprises one or more constituent layers, and
wherein a constituent layer closest to the substrate among the constituent layers of the transfer layer contains a copolymer of isobutyl (meth)acrylate and a monomer having a carboxyl group, and an acid value of the copolymer not less than 40 mg KOH/g.

* * * * *